United States Patent [19]
Seitz

[11] 3,785,078
[45] Jan. 15, 1974

[54] FISHING BAIT SINKER
[76] Inventor: Carl R. Seitz, 2806 E. Allerton, St. Francis, Wis.
[22] Filed: July 6, 1971
[21] Appl. No.: 159,877

[52] U.S. Cl. .............................. 43/43.14, 43/44.97
[51] Int. Cl. ........................................... A01k 95/00
[58] Field of Search ............. 43/43.14, 43.1, 44.97, 43/43.13

[56] References Cited
UNITED STATES PATENTS

| | | | |
|---|---|---|---|
| 2,741,863 | 4/1956 | Magill | 43/43.13 |
| 2,228,513 | 1/1941 | Frisbie | 43/43.14 |
| 2,863,253 | 12/1958 | Hettinger | 43/43.14 |
| 2,934,850 | 5/1960 | Moe | 43/43.13 |
| 3,084,471 | 4/1963 | Alspaugh | 43/43.14 X |
| 2,727,332 | 12/1955 | Benson | 43/44.97 |
| 3,456,379 | 7/1969 | Metzger | 43/43.14 |

Primary Examiner—Louis G. Mancene
Assistant Examiner—James H. Czerwonky
Attorney—James E. Nilles

[57] ABSTRACT

A sinker which is to be attached to a fishing line ahead of the bait and for causing the bait to sink in the water. The sinker has a tapered and pointed nose and is suspended from the line at a point forward of its midpoint length. That portion of the sinker located behind the attaching point is formed of a lighter weight, less dense material than the main body of the sinker, and the rear portion acts to maintain the sinker in a position with its pointed nose up-stream.

6 Claims, 7 Drawing Figures

PATENTED JAN 15 1974　　　　　　　　　　　3,785,078

INVENTOR:
CARL R. SEITZ
BY:
James E. Nilles
ATTORNEY

FISHING BAIT SINKER

BACKGROUND OF THE INVENTION

The invention pertains to fishing equipment and more particularly to a sinker for a bait and which is to be attached to the line for the purpose of guiding the bait to the proper depth.

An example of a prior art type of trolling sinker is shown in U.S. Pat. 2,577,965, which issued Dec. 11, 1951 to Hinkson and is entitled "Trolling Sinker." In that apparatus, a considerable portion of the metal is so shaped so as to form an inclined surface in the direction of the water flowing over the sinker. Prior art devices of this type have numerous surfaces and parts which are expensive to manufacture, cumbersome to use, inconvenient to carry, and subject to being entangled in weeds or the like. Furthermore, the metal material used in such a sinker is not used to its greatest efficiency so as to use it for the function for which the sinker was intended and consequently these complicated sinkers were not economical to manufacture.

SUMMARY OF THE INVENTION

The present invention provides a sinker for a bait and which is adapted to be suspended from the fishing line, the sinker having a pointed nose and being generally of a small diameter and elongated shape. The point of suspension of the sinker from the line is located at a point forward of the midpoint of the sinker's length. A rear part of the sinker is made of less dense material than the major portion of the sinker body, which construction acts to help maintain the sinker pointed in an upstream direction. The sinker provided by the present invention finds particular utility for use in casting, trolling, or in fast water where the nose of the sinker should preferably be pointed upstream at all times, to thereby provide the proper action for the bait and minimize the entanglement of the sinker and bait in weeds or the like. The sinker provided by the present invention makes maximum efficient use of the metal used to make the sinker. The sinker of the present invention is so shaped that it performs its sinking function better than other sinkers which have relatively large surfaces for deflecting the sinker in one direction or another.

These and other objects and advantages of the present invention will appear hereinafter as this disclosure progresses, reference being had to the accompanying drawings.

DESCRIPTION OF A PREFERRED EMBODIMENT

Figure 1:
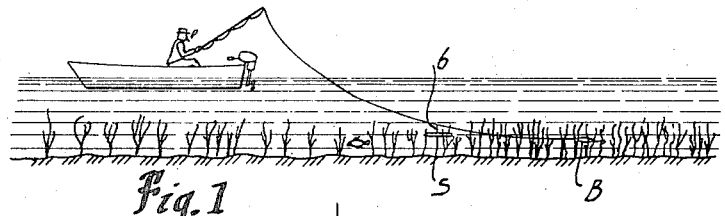
FIG. 1 is an elevational view of a sinker made in accordance with the present invention as employed in a trolling operation.
Figure 2:
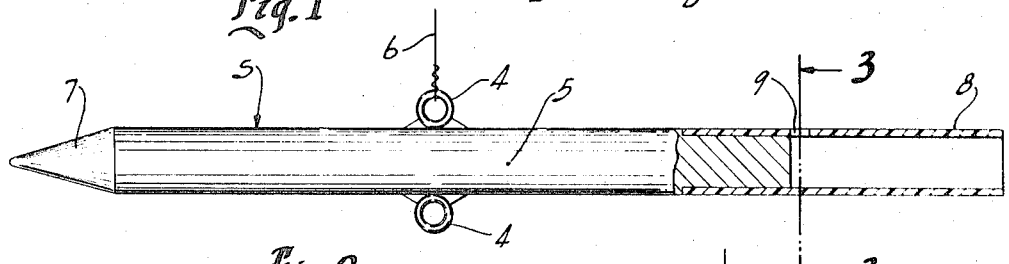
FIG. 2 is a longitudinal, cross sectional view, on an enlarged scale, of the sinker made in accordance with the present invention.
Figure 3:
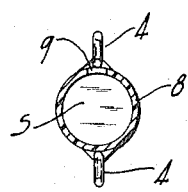
FIG. 3 is a transverse, cross sectional view through the sinker shown in FIGS. 1 and 2.

The present invention finds particular utility for use with a sinker for a bait when trolling, casting, or for use in fast moving streams. Under these circumstances, it is desirable to have the sinker maintained at a proper predetermined depth in the water and at the same time, pass through the water with a minimum of turbulence and also act to guide the line and bait in a proper direction through the water. All this must be done while at the same time, minimizing entanglement of the line, sinker, and bait with weeds or other obstructions.

It is desirable that economical use of the metal or other material of which the sinker is made is insured. That is to say, it is desirable that the sinker will seek the maximum depth for the amount of material used, and also considering the force of the water moving relatively over the sinker.

The sinker provided by the present invention is preferably fabricated from a metal such as lead, and is formed with its leading edge as a point an symmetrical along its longitudinal axis. Generally, the sinker S is cylindrical in shape and has an attaching eye 4 located intermediate its length. It will be noted that the point of attachment of the eye is generally forward of the midpoint 5 of the entire length of the sinker. The sinker is thus suspended from the main line 6 and ahead of the bait B.

The pointed nose 7 of the sinker insures that it will pass through the water with a minimum of turbulence and because of the symmetrical shape of the nose about the longitudinal center-line of the sinker, the sinker will not rise or fall due to the shape of the sinker, but instead the weight of the sinker determines its depth in the water.

The rear portion of the sinker is fabricated from a material of less density than the major portion of the sinker. For example, a tubular piece 8 is attached to the rear end of the main portion of the sinker and is shown as being fabricated from plastic. An air escape hole 9 extends through the tubular portion so as to relieve any vacuum formed in the tube and thereby allow any air to escape that otherwise may be trapped therein. Thus, the sinker has a longer length from its point of attachment to the rear end of the sinker than from the point of attachment to the nose of the sinker. This distribution of length relative to the point of attachment also helps insure that the sinker will always point upstream, that is in the direction from which the water flows over the sinker. In other words, an additional surface length is provided from the eye to the rear of the sinker and on which the flowing water can act.

Figure 5:
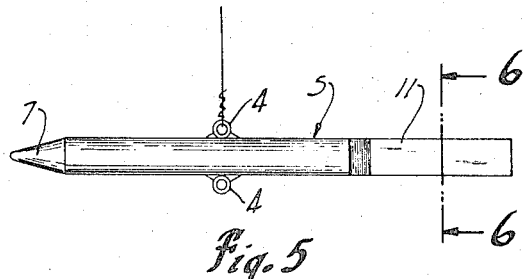
FIG. 5 is an elevational view of another form of sinker.

As shown in FIG. 5, the rear portion of the sinker is fabricated from a relatively flat and narrow plastic piece 10 attached to the main body of the sinker. This piece 10 also acts to provide additional surface area against which the water can act, thereby maintaining the proper direction of the sinker relative to the water flowing thereover.

The modification shown in FIG. 5 can also use a flat and narrow piece 10 which is fabricated from other materials such as for example, aluminum or wood.

Figure 7:
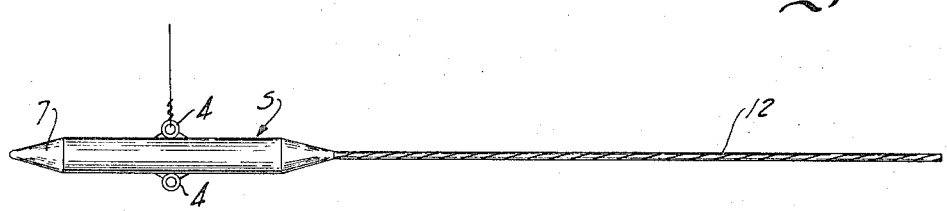
FIG. 7 is an elevational view of another modified form of sinker.

FIG. 7 is still another modified form of the invention and shows a flexible member such as a piece of cord 12 attached to the rear portion of the main body. This cord also has the effect of tending to cause the sinker to orientate itself properly in the water, that is with its nose pointing upstream.

Figure 6:
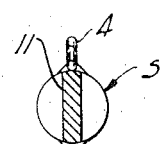
FIG. 6 is a sectional view along line 6—6 in FIG. 5.

The string or other flexible member which is attached to the main body as shown in FIG. 6 creates sufficient drag to keep the sinker facing in a forward position that is to say with the pointed nose in the upstream direction.

Figure 4:
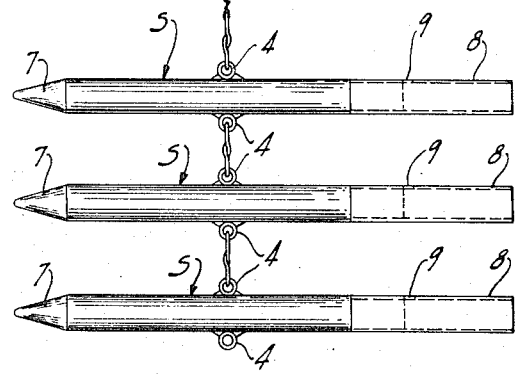
FIG. 4 shows several of the sinkers shown in FIGS. 1, 2 and 3, as used together.

As shown in FIG. 4, several of the above described sinkers can be attached to one another to provide the additional weight desired for the depth in the water. All of the sinkers properly orientate themselves in the water as above described.

With the sinkers provided by the present invention, an efficient use of material for the sinker is utilized and in which the maximum amount of depth is possible for a given weight of material. The pointed, symmetrical nose maintains the sinker orientated in the upstream direction while the additional length of the sinker behind its attaching point also assures that the sinker is orientated properly in the moving water. The various modifications made in accordance with the present invention are all balanced so that they hang from a line in a horizontal position.

The sinker provided by the present invention is extremely simple in design, economical to manufacture, easy to carry and tends to minimize entanglement of the line, sinker and bait with weeds or the like.

The sinking devices as provided by the present invention are highly snag resistance because if the sinker tip happens to get hooked on some underwater object, the front will tip itself forward and pull itself free. If an underwater object is struck, the hydro-dynamic qualities of the sinker are temporarily destroyed and a greater surface is temporarily presented to the flow of water causing the sinker to plane momentarily to thereby move to a higher level and avoid other underwater objects.

I claim:

1. A sinker for a fishing line having a bait at the end thereof and comprising, an elongated cylindrical shaped body fabricated from a metal, said body having a one piece tapered and pointed nose portion which is symmetrical about the longitudinal axis of said body, an elongated portion attached to the rear of said metal body, said portion having a width substantially equal to that of said metal body and being of less density than the metal body, said shaped body having a length greater than that of said elongated portion, attaching means mounted on said shaped body for hanging attachment from said fishing line and intermediate the ends of said line, said attaching means positioned along the length of said shaped body at a location forward the midpoint of said sinker and at a location which will maintain said sinker in a horizontal position and the nose portion pointed in the direction of sinker movement.

2. The sinker set forth in claim 1 wherein the rear portion is comprised of a tubular material attached to the rear end of said main portion and extending rearwardly therefrom.

3. A sinker as set forth in claim 2 including an aperture through said rear portion and at the upper side thereof to permit the escape of air therefrom when said sinker is immersed.

4. The sinker as described in claim 1 including second attaching means directly beneath said attaching means for hanging another similar sinker thereto.

5. The sinker as described in claim 2 including second attaching means directly beneath said attaching means for hanging another similar sinker thereto.

6. The sinker as described in claim 3 including second attaching means directly beneath said attaching means for hanging another similar sinker thereto.

* * * * *